United States Patent
Emelyanov et al.

(10) Patent No.: US 9,817,840 B1
(45) Date of Patent: Nov. 14, 2017

(54) COMMON FILE CACHING FOR VIRTUAL PRIVATE SERVERS

(71) Applicant: Parallels IP Holdings GmbH, Schaffhausen (CH)

(72) Inventors: Pavel Emelyanov, Moscow (RU); Kirill S. Korotaev, Moscow (RU); Stanislav S. Protassov, Moscow (RU); Serguei M. Beloussov, Singapore (SG); Alexander G. Tormasov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 0 days.

(21) Appl. No.: 15/070,279

(22) Filed: Mar. 15, 2016

Related U.S. Application Data (63) Continuation-in-part of application No. 14/065,710, filed on Oct. 29, 2013, now Pat. No. 9,286,310.

(60) Provisional application No. 61/726,043, filed on Nov. 14, 2012.

(51) Int. Cl.
*G06F 17/30* (2006.01)

(52) U.S. Cl.
CPC .............. *G06F 17/30132* (2013.01)

(58) Field of Classification Search
CPC .................................. G06F 17/30132
USPC ........................................... 707/812
See application file for complete search history.

(56) References Cited

U.S. PATENT DOCUMENTS

| | | | |
|---|---|---|---|
| 7,584,228 B1 * | 9/2009 | Protassov | G06F 17/30156 |
| 7,809,868 B1 * | 10/2010 | Mu | G06F 3/0604 |
| | | | 709/230 |
| 8,010,495 B1 * | 8/2011 | Kuznetzov | G06F 9/45533 |
| | | | 707/639 |
| 2013/0073813 A1 * | 3/2013 | Bacik | G06F 12/0866 |
| | | | 711/144 |

* cited by examiner

*Primary Examiner* — Joshua Bullock
(74) *Attorney, Agent, or Firm* — Bardmesser Law Group (57) ABSTRACT

A host runs an operating system kernel. A plurality of virtual private servers (containers) is supported within the kernel. The containers use the same files. A template cache has pre-calculated file checksums. The checksum is calculated each time the file is created and/or modified. Each file has an inode containing an attribute indicating whether the checksum is calculated and stored along with the file. If the checksum is present, the process is redirected to access the file with the same inode in the shared disk cache.

20 Claims, 5 Drawing Sheets

COMMON FILE CACHING FOR VIRTUAL PRIVATE SERVERS

CROSS-REFERENCE TO RELATED APPLICATION

This application is a continuation of U.S. patent application Ser. No. 14/065,710, filed on Oct. 29, 2013, which is a non-provisional application of U.S. Provisional Patent Application No. 61/726,043, filed Nov. 14, 2012, entitled COMMON FILE CACHING FOR VIRTUAL PRIVATE SERVERS, incorporated by reference herein in its entirety.

BACKGROUND OF THE INVENTION

Field of the Invention

The present invention is related to virtual private servers, and more particularly, to caching of common files of the Virtual Private Servers (VPSs).

Related Art

With the popularity and success of the Internet, server technologies are of great commercial importance today. An individual server application typically executes on a single physical host computer, servicing client requests. However, providing a unique physical host for each server application is expensive and inefficient.

For example, commercial hosting services are often provided by an Internet Service Provider (ISP), which generally provides a separate physical host computer for each customer on which to execute a server application. However, a customer purchasing hosting services will often neither require nor be amenable to paying for use of an entire host computer. In general, an individual customer only requires a fraction of the processing power, storage, and other resources of a host computer.

Accordingly, hosting multiple server applications on a single physical computer is desirable. In effect, each server application needs to be a container—an isolated Virtual Private Server (VPS), simulating a server application executing on a dedicated physical host computer. Such functionality is unavailable on conventional server technology because, rather than comprising a single discrete process, a virtual private server must include a plurality of seemingly unrelated processes. Each container process performs various elements of the functionality required by the customer and each process uses its own files located in an isolated private area of a container (VPS).

Thus, another difficulty in implementing multiple VPSs within a single physical host involves providing each VPS (container) with a separate file system. A file system is an organized accumulation of data within one or more physical storage devices, such as a hard disk drive or RAID (redundant array of inexpensive disks).

The data is typically organized into "files", such as word processing documents, spreadsheets, executable programs, and the like. The files are stored within a plurality of "storage units" of the storage device, sometimes referred to as "disk blocks" or "allocation units."

Unfortunately, providing a separate physical device for storing the file system of each virtual private server would be expensive and inefficient. Thus, each VPS (container) has its own private area for storing files used by the VPS. However, when a number of identical VPSs (containers) are implemented on a physical host, the VPSs have identical sets of files used for supporting an operation of the VPS.

While sharing of files between among VPSs does not present a problem, providing the containers with an effective method for making different coincident files shared is problematic.

Accordingly, there is a need for an efficient and effective method for referencing and using common VPS (container) files.

SUMMARY OF THE INVENTION

Accordingly, the present invention is related to caching of commonly used files of Virtual Private Servers/containers that substantially obviates one or more of the disadvantages of the related art.

In one embodiment, there is provided a server including a host running an operating system kernel. A plurality of containers (VPSs) is supported within an operating system kernel. At least one application is available to users of the VPS. Each VPS has its own virtual address space (or its own set of addresses), which includes memory, IP addresses, disk drive addresses, SMB network names, TCP names, pipe names, etc. Each VPS has its own objects and files, shares services of the single instance of the OS, and virtualizes the single instance of the operating system. Each of the objects and the files of each VPS have a unique identifier in a context of the operating system kernel.

Each VPS cannot affect files of another VPS/container, or objects of another VPS, and cannot access information about processes running on another VPS. The server resources include any of a virtual memory allocated to each user, a pageable memory allocated in the OS kernel to support the VPSs, a pageable memory used by the OS kernel for support of user processes either in shared, or in exclusive form (i.e., either in support of user processes of one VPS, or in support of user processes of multiple VPSs), a resident memory allocated in the OS kernel, physical memory used by the user processes, a share of CPU resources, security descriptors (or other identifiers related to the rights of the users and the VPSs), objects and files used by the OS kernel, I/O interfaces and their utilization level by the particular VPS, file and/or disk space, and individual user resource limitations.

Each VPS includes a plurality of processes, each with at least one thread servicing corresponding users, a plurality of objects and files associated with the plurality of threads. According to an exemplary embodiment, if the VPS processes use files for read and write operations, the host OS calculates hash values/checksums for each of the files. The hash values/checksums are used as file attributes. The file hash/checksum attribute is generated upon file creation (i.e., upon execution of close( ) operation). The hash attributes are contained in the extended attributes of the files that are stored along with the file.

When a VPS process accesses a file, the hash/checksum attribute is checked against the database, and, if an identical file (with the same inode-checksum and the same size) is found, the file is places into a disk cache. A special OS kernel utility checks the hash/checksum attribute. If the file checksums match, the file is not copied. Instead, a file redirect reference is used for opening the file located in private container directory. The file can be remapped (i.e., redirected), by a special kernel utility, in the VPS process space to the disk cache. Subsequently, the VPS processes access the file on the disk cache instead of the VPS private space.

The server software can be an add-on to any of Microsoft WinDOWs NT Server—Terminal Server Edition, Microsoft Windows 2000 Server—Terminal Server, and Microsoft Windows Server 2003—Terminal Services, or any server based on a Microsoft Windows product. The operating system includes a plurality of threads for execution of user requests. The VPSs appear to a user as substantially stand-alone servers, and generally provide the functionality of a stand-alone server or remote computer, including all administrative operations.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DETAILED DESCRIPTION OF THE INVENTION

Reference will now be made in detail to the preferred embodiments of the present invention, examples of which are illustrated in the accompanying drawings.

The present invention is directed to a system, method and computer program product for caching commonly used VPS (container) files. A VPS (or a container) is a closed set, or collection, of processes, system resources, users, groups of users, objects and data structures. Each VPS has an ID, or some other identifier, that distinguishes it from other VPSs.

The VPS of the exemplary embodiment offers to its users a service that is functionally substantially equivalent to a standalone server with remote access. From the perspective of an administrator, the VPS of the present invention appears substantially the same as a dedicated computer at a data center.

From a user perspective, the VPS functionally acts essentially like a remote server, and offers the same services, for example, through a dedicated IP address. Note that some processes running in kernel mode can provide services to multiple VPSs.

In a system with a single OS, each VPS virtualizes the OS, and utilizes services of the OS. Each VPS includes a plurality of processes, each with at least one thread servicing corresponding users, a plurality of objects and files associated with the plurality of threads. The VPS processes use some of the same files. A co-pending U.S. patent application Ser. No. 11/972,556, incorporated herein by reference, provides a system for implementing links to commonly used VPS files located in a host physical memory.

Whenever a VPS process requires a file, it locates a file link in a VPS private area and accesses the file in the physical memory. However, this system does not always work when a VPS is restored from a backup. Typically, some of the links referencing the VPS files do not work or point to a wrong location, and the VPS cannot be launched.

According to the exemplary embodiment, when VPS processes use files for read and write operations, the host OS calculates hash values or checksums for each of the files. The kernel utility intercepts read and write operations for files and performs required actions when it detects a file that is not shared. Note that the file cache can be generated upon the file creation. The hash values/checksums are used as file attributes. The container file hash/checksum attribute is generated upon file creation (i.e., upon execution of close( ) operation). The hash attributes are stored in a database and sorted by file size attribute. Note also that unsorted records can be kept in the database. As an example, hashes may be divided into groups.

The first bits of hashes are used as folder (group) name and corresponding sorted or unsorted hashes are stored inside. When a new hash value is received, it is directed to corresponding folder, as a type of sorting algorithm. For example file with hash "ABCD" can be stored as a file "ABCD" or D in subfolder "C" in subfolder "B" in root folder or subfolder "A". The letters "A-D" can be numbers of the hex code. The hash value can also be used as an address of a storage unit where corresponding data is stored, e.g., stub to shared file. The proposed method does not necessarily require additional sorting of any kind.

When a VPS/container process accesses a file, the hash/checksum attribute is checked against the database, and if an identical file with the same inode (checksum and size) is found, the file is places onto a disk—a memory cache in RAM can be located on a local server or on any server of the cluster or in the cloud cluster. Note that it is better not to use host-client requisites for VPSs. It is preferable to use a local single node and/or a cluster of nodes. These operations can be performed by a special daemon. Then, the file in the container private directory is assigned a redirect link to its copy on the disk cache. Subsequently, the VPS processes access the file on the disk cache instead of the VPS private space.

In other words, the OS kernel determines access to a disk where file inode is stored. If identical inodes are detected, the inode (checksum and size) value is provided to a user space daemon. The user space daemon is a user space application that checks all container files and collects file access statistics. The user space daemon can be implemented on the local server or on any server of the cluster or in the cloud cluster. For example, if the user space daemon detects some files in container private directory that are frequently accessed by container processes, the user space daemon processes this information and takes appropriate actions.

The OS kernel checks if the files have identical inodes in the database and, if the identical inodes are found, assigns redirect links to location of the same files in the disk cache. The user space daemon also clears the disk cache of old files that have not been requested for a long time.

If a file is open for write, the hash/checksum file attribute is discarded and a new attribute is generated upon completion of the write operation. These actions are performed by an updated I/O subsystem of OS kernel. According to the exemplary embodiment, only the files that are located in the directory with an attribute "checksum=auto" have a hash/ checksum attribute generated upon close( ) operation. For example, a directory "/bin" has an attribute "checksum=auto."

If a file "/bin/xxx" is written into this directory, the hash/checksum "XXX" is calculated for this file and written into the file attribute "checksum=XXX." Note that, for example, directory "/home" does not have a checksum attribute, and user files in this directory are not hashed, because a chance of coincidence of user files is extremely small compared to the container files.

According to the exemplary embodiment, known hashing algorithms can be uses, such as, for example, SHA20, Gold Fish, ECB, SHA1, SHA2, SHA256, SHA512, etc. If a file is stored at block level, the hash can be changed when the file blocks change. In this case, the hash is recalculated for a particular data block. This needs to be done fast, so a simple (short) hash function is recommended. Alternatively, hash values need to be calculated and stored for each data block.

According to the exemplary embodiment, a number of files (inodes) is not limited, but a disk space available for files is pre-set ahead of time. The files that have not been accessed for a long time are removed from cache and discarded. The file access check and removal can be performed by another user space daemon, which scans the virtual storage independently from the users and removes files. The file expiration time is set by a system administrator. Alternatively, the files can be archived in a compressed form.

Note that the main advantage of the exemplary embodiment is not so much saving the disk space, but reducing a number of disk accesses. Thus, system efficiency and speed are advantageously increased. For example, if a hundred identical containers (VPSs), when loaded, randomly access ten pages, the number of accesses is reduced by (100−1)*10 accesses. Note that 990 random accesses to a conventional rotational HDD come to approximately 10 seconds of disk operation time.

In other words, instead of reading the same file five times from five different locations, the file is read once from the disk cache. The OS kernel detects presence of a common file for inodes (i.e., sets of file metadata, such as file extension, checksum and size), and quickly finds it. The user space daemon finds the common container files based on the file access statistics. The daemon runs in the user space, but cannot be controlled by VPS users. An administrative node (VPS0) controlled by the system administrator can control the proposed daemons. If a file is simply re-named inside the container without affecting its hash value, nothing happens and the file may be read using an old hash value. If changes in file contents and file metadata affect the hash value, another instance of the file may be created in the container's dedicated space, and then the file can be shared, as described.

In one exemplary embodiment, the system automatically periodically scans containers for identical files using another user space daemon. The files are copied into a cache and stored there until their expiration time, after which the files are discarded or saved into an archive. This increases overall system performance and operative memory usage, if a system has large amounts of redundant data (i.e., language settings, geographic location specific data, graphic primitives, etc.).

Note that if a file is changed, the changed instance of file remains in container's private directory. A list of container (VPS) processes is used for caching files into a fast disk cache. The file is always located in container's private directory. However, for fast file open operations PFcache file version can be used. According to the exemplary embodiment, a container (VPS) file remains in the container's private directory after it is copied to disk cache. In case of migration of a container or if the container needs to be restored from a backup, the file stored in the private directory is used, if the file in the disk cache is not available.

When the container process attempts to access a file in a container private directory, the process encounters a redirect to the file located on the disk cache. However, if the redirect does not work (for example in case of container migration to another host), the process accesses the file in the private directory using a placeholder in a file system tree (inode tree). Alternatively, if a file referenced by redirect cannot be accessed after several attempts, the file checksum attribute is discarded. Then, the new checksum attribute is generated upon file modification.

According to the exemplary embodiment, template files are used whenever available. A template cache has pre-calculated checksums. The checksum is calculated each time the file is created and/or modified. Each file has an inode containing an attribute indicating whether the checksum is calculated and stored along with the file. If the checksum is present, the container process is redirected to access the file with the same inode in the shared disk cache. According to the exemplary embodiment, the checksums are stored automatically.

Figure 1:
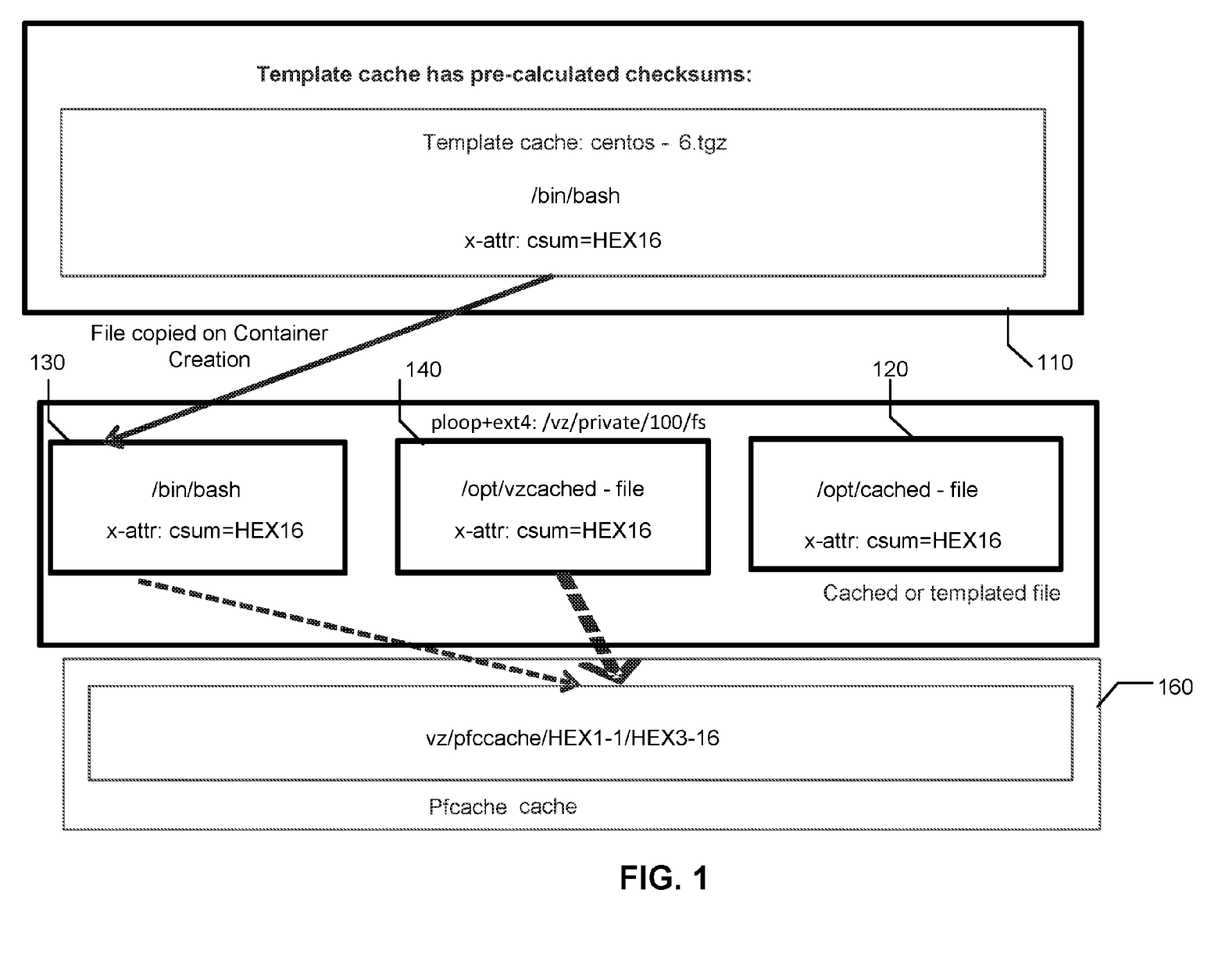
FIG. 1 illustrates disc cache layout in accordance with the exemplary embodiment.

FIG. 1 illustrates disk cache layout, in accordance with the exemplary embodiment. A file is created and file checksum/hash is calculated and placed into an exemplary file template cache 110 "centos-6.tgz." (where "6" may be a revision number of file and "tgz" is a file extension that means it is a compressed data container (as opposed to a virtual container). The file checksum attribute is assigned "x-attr: csum=HEX16." Upon container creation, the file is copied with pre-calculated "x-attr" (checksum value) from template cache to ploop 120.

The ploop 120 is a virtual block device and driver that gets its data from file instead of physical storage. The ploop 120 is a reimplementation of Linux loop device that supports: modular architecture, different file formats ("plain", QCOW2, etc), network storage (NFS), snapshots and fast provisioning via stacked images and consist write tracker for faster live migration. The ploop 120 is a disk loopback block device, not unlike a loop, but with many features like dynamic resize, snapshots, backups etc. The main idea is to put container file system in a file. Upon container creation, the file is copied into a directory 130 "/bin/bash/." The ploop 120 checks the files in the container private directory "/vz/private/100/fs." Then, if a file has a hash/checksum attribute "x-attr: csum=HEX16", the file is placed into a local template cache 140 "/opt/vzcached-file" along with the file checksum attribute "x-attr: csum=HEX16." Then, the file is saved locally at 150 "/opt/cached-file" with its attribute "x-attr: csum=HEX16" for container use in cases when the cached file is not available (i.e., lost or pruned).

The file from a template cache 140 "/opt/vzcached-file" is moved to a disk cache 160 "/vz/pfcache/HEX1-2/HEX3-16." Alternatively, the file from a local container storage 130 "/bin/bash/" is not cached into cache 140, but is cached on-demand or in a lazy fashion into the disk cache 160. Lazy caching means that the user space daemon collect statistics on container files accesses and the OS kernel eventually caches the files based on the statistics processed by the user space daemon.

Note that upon application template installation, original RPM (package manager or package management system) installs files, kernel assists and checksums them lazily. Then, the cache 160 processes file checksums, modifies files and sets file attributes "xattrs." Additionally, the cache 160 detects file clones having the same inodes. The clones may be detected by hash generation for the file and subsequent comparison of file content itself. Since the probability of coincidence of starting bits of different files with the same hash is very small, only predefined parts of the files—file sizes may be compared to prove coincidence verdict. Note that the hashes are identical in this case.

Figure 2:
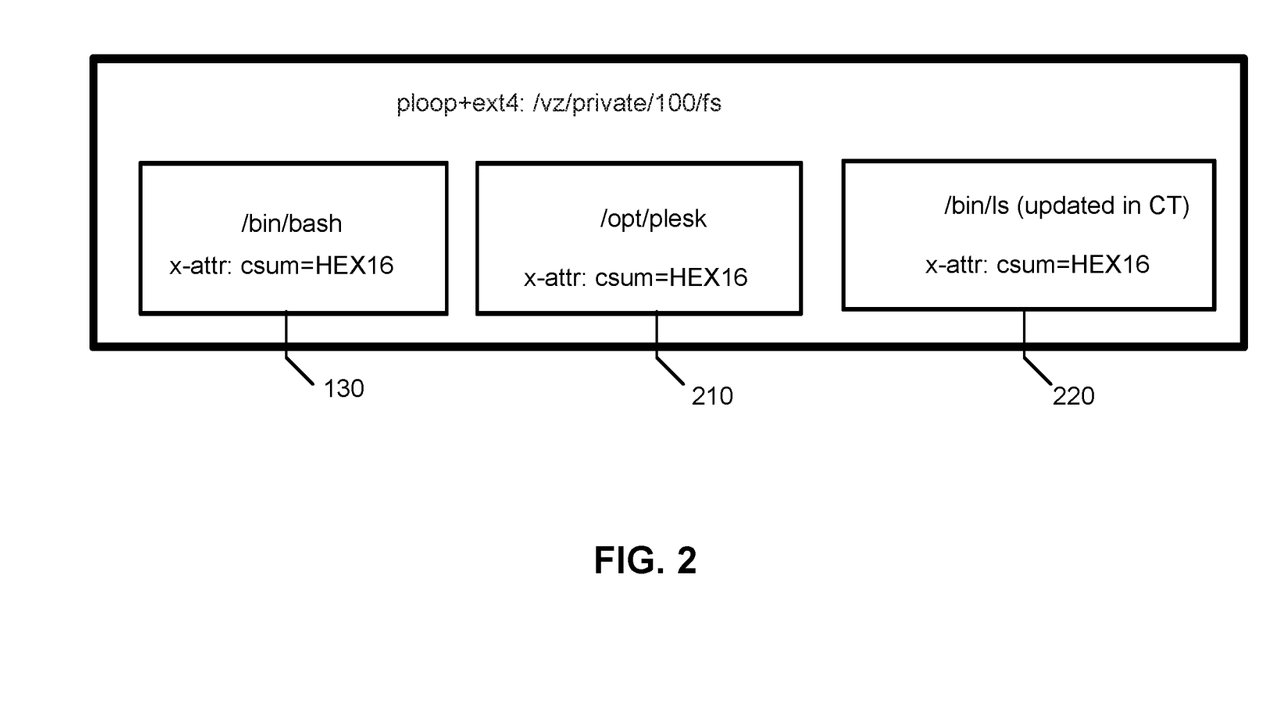
FIG. 2 illustrates how hash (checksum) container file attributes are created, in accordance with the exemplary embodiment.

FIG. 2 illustrates how checksum/hash container file attributes are created, in accordance with the exemplary embodiment. According to the exemplary embodiment, container creation extracts a file with pre-calculated checksum attribute "xattr" from a template cache and copies it into the local container storage 130 "/bin/bash/."

Upon installation of an application template, the original RPM or another package manager (or installer) installs the files and optionally templates. The kernel assists in the process and checksums files "x-attr: csum=HEX16" lazily into cache 210 "/opt/plesk." The cache 160 (see FIG. 1) generates checksums for modified files and sets their attributes "x-attr." Subsequently, the file attributes "x-attr: csum=HEX16" are updated in the container private directory "/bin/ls."

Figure 3:
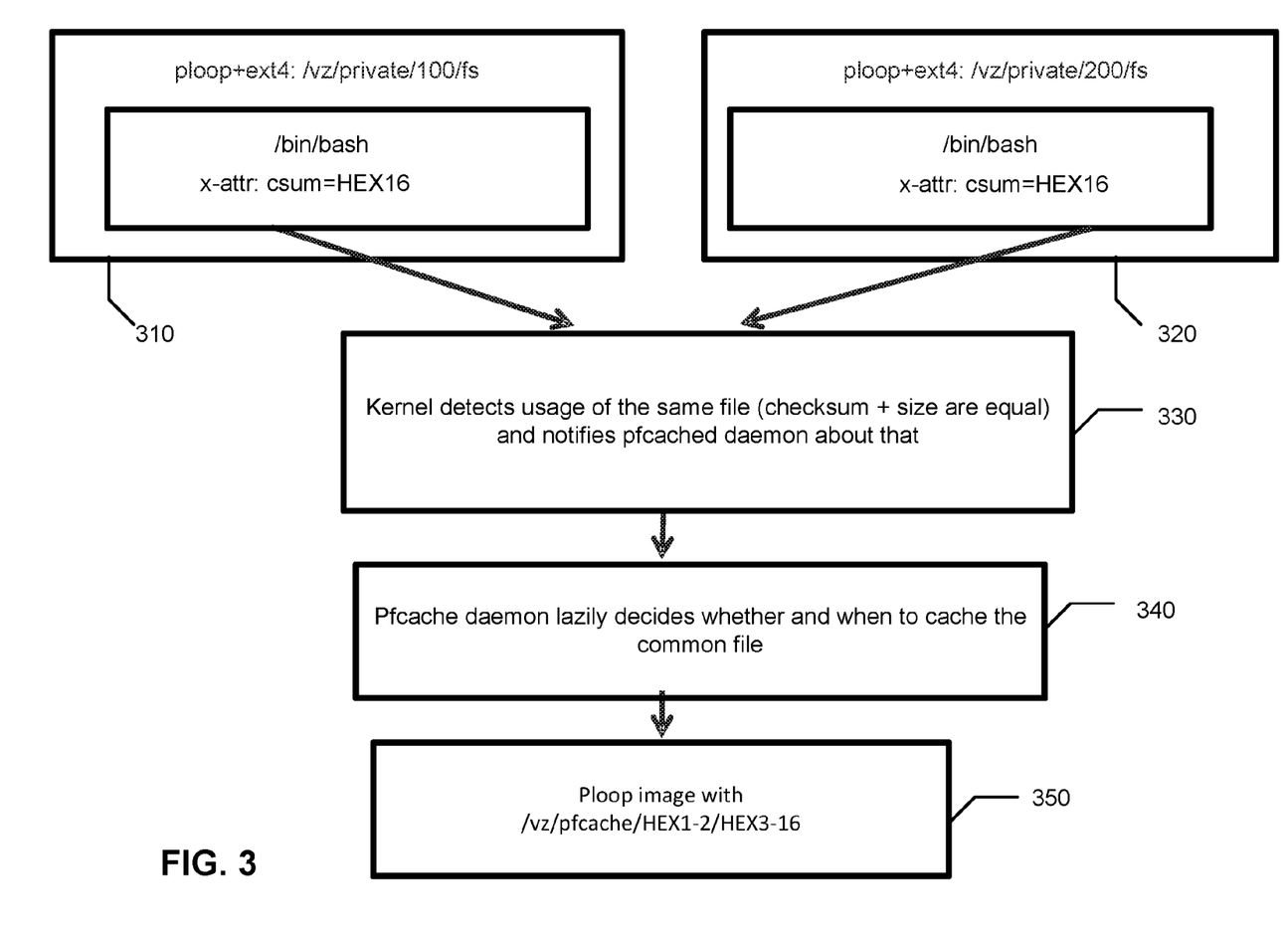
FIG. 3 illustrates how file cache is created, in accordance with the exemplary embodiment.

FIG. 3 illustrates creation of caches, in accordance with the exemplary embodiment. The application templates are installed by RPM, which is assisted by kernel and file attributes "x-attr" are calculated on-the-fly. Additionally, the cache 160 recalculates checksums of the files that have been recently modified from the time of the previous calculation.

The kernel can request the files to be cached, if the file's inode (checksum and size) matches the inode of another file being accessed. For example, the files located in private directories of containers 310 and 320 have the same attributes (the checksums and sizes). Kernel 330 detects usage of the same file (checksum+size are equal) and notifies cache daemon about that. The cache daemon 340 lazily decides whether and when to cache the common file. The ploop 350 is used for limiting the cache size using the file image. The ploop is a type of virtual disk or image having certain characteristics, as described above, and corresponding drivers. Note that the ploop 350 can be implemented as a separate partition.

According to the exemplary embodiment, a global cache "/vz/pfcache" is used for cashed redirect links for both templates and cached files. Files are cached lazy—initially disk cache "pfcache" is empty and the disk cache is filled based on container file access statistics collected by the cache daemon 340. The disk cache is assembled dynamically and only accessed files common between containers are be cached. Unused files are removed from the cache after a certain expiration time.

According to the exemplary embodiment, the file checksum attribute is cleared by the kernel upon file modification. The files located in cache but no longer accessed by container processes are "pruned" by a user space daemon. This can be done when the cache size grows to a certain limit.

When the cache size grows to its limit, the old files are moved to a "to-be-removed" sub-directory. All files in this subdirectory should be removed before this action. If the kernel reports that some of the moved files are still in use, the files are moved back by the user space daemon. A special thread performs a preventive background remove operation.

Detection of the expired files is done based on file access time stamps. When accessing a cached file by the checksum attribute redirect link, the kernel updates access time (if the current time is, for example, 12 hours ahead of the time in the time stamp).

Note that templates can be cached as "simfs" (disk representation or layout of virtual kind being used in OpenVZ project) templates but with attributes including the file checksums. The templates can be removed by simple removal of cached "template.tgz" file (e.g., upon update).

A container/VPS is created by unpacking cached container template that has files and attributes inside. A container can be discarded by removal of the container private directory. Note that the cached files are pruned later depending on last file access times.

According to the exemplary embodiment, containers/VPSs can be restored or migrated. A copy of the container can be easily created. No additional actions are, advantageously, required, because the same cached container files are automatically used (if present), otherwise the needed files are created on-demand (i.e., in lazy fashion), if another container has the same files.

Note that copying of cache/templates is not needed. The disk cache is recreated automatically (lazily and on-demand) depending on files access. In one exemplary embodiment, a container/VPS can be upgraded from an old layout. The container is mounted, new ploop image is mounted and the files are copied. The ploop image looks similar to other images, e.g., ISO images or the like. In other words, a file or inode represents a file system as if it were a real file system. Alternatively, the files (templates) with calculated checksums can be saved.

According to the exemplary embodiment, the application template is installed as follows:

Original rpm/dpkg is used (i.e., hacking is not required); dpkg is a networked packet containing consistent information required for software installation. Rather than software itself, it may contain user manual, debugging data, settings and so on. The packets are installed as is, and then the data is sorted.

Kernel assists and creates checksums of the files created by rpm on-the-fly; and Strong SHA1 checksum is used for file checksum/hash generation.

Note that SHA1 calculation speed is quite high. On modern hardware, the speed is ~300 Mb/sec. This is comparable with a very good disk speed. The SHA1 is long (20 bytes or 40 HEX), so it should be encoded into the checksum attribute to ~27 characters using [0-9a-zA-Z . . . ] alphabet. According to the exemplary embodiment, the attribute values=SHA1+file size are compared to determine the identical file inodes.

According to the exemplary embodiment, the cache daemon runs in separate BC (UBC) or other Resource Controller. A set of limits (a beancounter or a user beancounter) can be used to prevent system from being overloaded by daemons. User Resource Beancounters (UBC) allows to account and control consumption of kernel resources used by group of processes. The full UBC patch set allows to control:

kernel memory. All the kernel objects allocatable on user demand should be accounted and limited for DoS protection, for example, page tables, task structs, vmas etc.; and virtual memory pages.

The UBC allows for limiting a container to some amount of memory and introduces 2-level OOM (Out Of Memory) killer taking into account container's consumption. Pages shared between containers are correctly charged as fractions (tunable). Note that a typical OOM case occurs when the operating system is unable to create any more virtual memory, because all of its potential backing devices have been filled. Operating systems such as Linux will attempt to recover from this type of OOM condition by terminating a low-priority process, a mechanism known as the OOM Killer, which is still vulnerable in some cases to memory leak. A memory leak occurs when a computer program incorrectly manages memory allocations. In object-oriented programming, a memory leak may happen when an object is stored in memory but cannot be accessed by the running code.

network buffers. These includes TCP/IP rcv/snd buffers, dgram snd buffers, unix, netlinks and other buffers.
    minor resources accounted/limited by number:
    tasks, files, flocks, ptys, siginfo, pinned dcache
    mem, sockets, iptentries (for containers with virtualized networking)
    All or some of these can be used to limit IOPS/bandwidth or on ploop (to limit disk space used by disk cache).

Virtuozzo™ resource controllers provide in addition to the control of memory and system resources:

CPU usage control (detailed information on this resource is given in the Controlling CPU Time Consumption section);
    disk quota (please see the Managing Resources chapter of Parallels Virtuozzo Containers User's Guide);
    network traffic accounting and shaping (please see the Managing Resources chapter of Parallels Virtuozzo Containers User's Guide).

Here, the space is limited. If there is no space for new writes, old data is deleted. Note that in order to minimize cached file access time, the file inode that contains redirect information needs to be limited in size, so it fits within one data block. Use of SHA1 hashing algorithm provides the inodes of desired length.

If the daemon is a part of resource manager, it can access all container files and can calculate hashes for them. Then, the daemon can force files reallocation when it should be shared.

Figure 4:
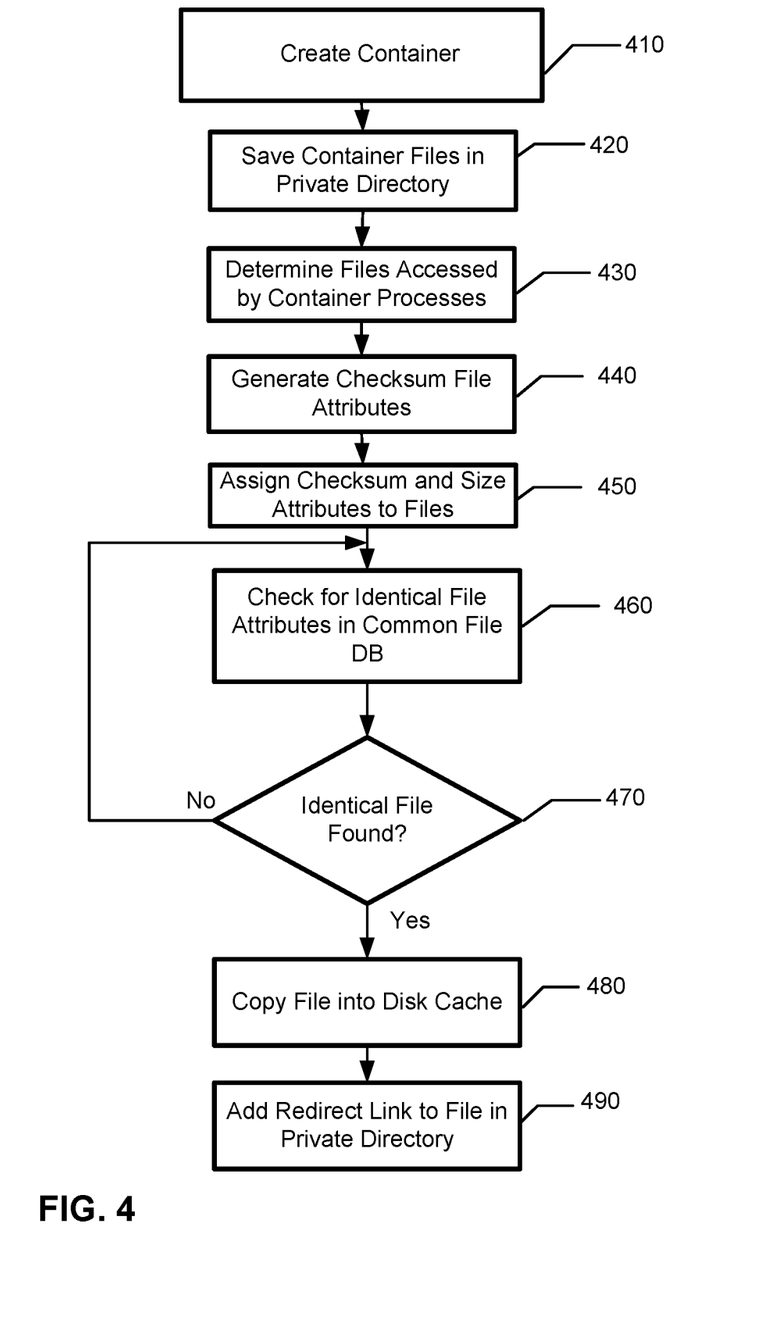
FIG. 4 illustrates a method for caching container files in accordance with the exemplary embodiment.

FIG. 4 illustrates a flow chart of a method in accordance with the exemplary embodiment. A container is created in step 410. Container files are stored in a container's private directory in step 420. System kernel determines files accessed by container processes in step 430. File checksums (hashes) are generated for the files used by the container processes in step 440. Then, in step 450, checksums and file sizes are assigned as file attributes.

In step 460, the kernel checks for identical files used by other containers by comparing the file attributes (size and checksum) against the attributes of common files stored in a database. If, in step 470, an identical file is found, the file from the container private directory is copied into a disk cache in step 480. Otherwise, the kernel checks another container file in step 460. Subsequently, the file in the private directory is assigned a redirect link to its copy in the disk cache. So, the next time the container process accesses the file, it is redirected to the file copy in the disk cache.

As a further option, the concepts described herein may be applicable even to file systems that do not support extended attributes, such as NFS. In those cases, "shadow symbolic links" can be used—for example, in the case of NFS, the extended attributes, such as checksums, can be stored in a file with a reserved name, such as "silly rename". Under that name, for each file that needs to link to the cache area, a silly rename file can be stored "next to it", with the checksum and the link to the cache. Also, the caching can be not just on the inode level, but also on a block level (e.g., 4 KB blocks, or other block size supported by the file system). The bitmaps of the cached blocks can be stored in the extended attributes of a file.

Figure 5:
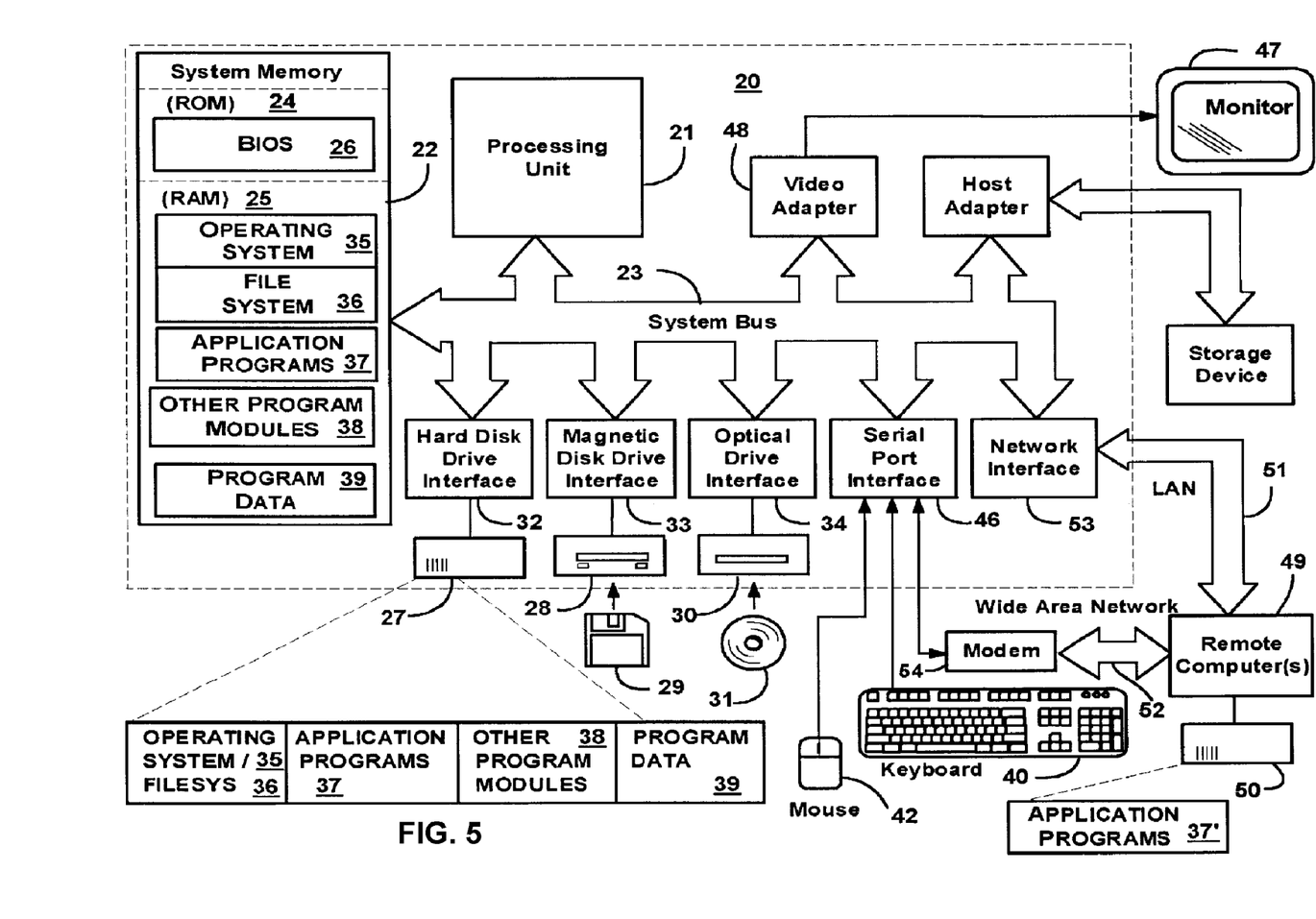
FIG. 5 illustrates an example of a host computer system that can be used in the present invention.

FIG. 5 illustrates an example of a host computer system that can be used in the present invention. With reference to FIG. 5, an exemplary system for implementing the invention includes a general purpose computing device in the form of a computer/server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and system have been achieved. In particular, those skilled in the art would appreciate that the proposed system and method provide for efficient caching and sharing of files among the containers (VPSs).

It should also be appreciated that various modifications, adaptations and alternative embodiments thereof may be made within the scope and spirit of the present invention. The invention is further defined by the following claims.

What is claimed is:

1. A computer implemented method for caching container files, the method comprising:
   creating a container running on a computer;
   saving container files into a private directory;
   generating checksum file attributes for container files accessed by container processes;
   assigning the checksum attributes and size file attributes to files' inodes;
   checking for identical file inodes in a common file database;
   copying the container files into a disk cache in a lazy mode, if the identical inodes are found, after frequently accessed container files that do not have cache links are detected;
   adding a cache link to the container files in the private directory, and
   storing bitmaps of the cached blocks in extended attributes of a file,
   wherein the cache link points to a copy of a corresponding container file in the disk cache, and
   wherein the caching is performed on a block basis.

2. The method of claim 1, further comprising acquiring the cache links from the container files in the private directory and accessing the corresponding container files in the disk cache.

3. The method of claim 1, further comprising copying the container files into the disk cache on-demand by a user space daemon.

4. The system of claim 3, wherein the user space daemon shares the container file in the disk cache, if the container files' inodes match the inodes of the commonly used container files from the database.

5. The method of claim 1, further comprising copying the container files with pre-calculated checksums from a file template cache.

6. The method of claim 1, wherein the generating of the checksum file attributes is implemented at a file creation.

7. A computer implemented method for caching container files, the method comprising:
   creating a container running on a computer;
   saving container files into a private directory;
   generating checksum file attributes for container files accessed by container processes;
   assigning the checksum attributes and size file attributes to shadow symbolic links corresponding to the container files;
   checking for identical attributes in a common file database;
   copying the container files into a disk cache, if the identical attributes are found; and
   adding cache links to the shadow symbolic links,
   wherein the cache links point to copies of corresponding container files in the disk cache, and
   wherein the checksum file attributes are calculated using any of:
   SHA 20;
   Gold Fish;
   ECB;
   SHA1;
   SHA2;
   SHA256; and
   SHA512.

8. The method of claim 7, further comprising acquiring the cache links from the container files in the private directory and accessing the corresponding container files in the disk cache.

9. The method of claim 7, further comprising copying the container files into the disk cache on-demand by a user space daemon.

10. The system of claim 9, wherein the user space daemon shares the container file in the disk cache, if the shadow symbolic links match the shadow symbolic links of the commonly used container files from the database.

11. The method of claim 7, further comprising copying the container files with pre-calculated checksums from a file template cache.

12. The method of claim 7, wherein the generating of the checksum file attributes is implemented at file creation.

13. A computer implemented method for caching container files, the method comprising:
   creating a container running on a computer;
   saving container files into a private directory;
   generating checksum file attributes for container files accessed by container processes;
   assigning the checksum attributes and size file attributes to files' inodes;
   checking for identical file inodes in a common file database;
   copying the container files into a disk cache in a lazy mode, if the identical inodes are found, after frequently accessed container files that do not have cache links are detected;
   adding a cache link to the container files in the private directory, and
   recalculating the checksum attributes upon container file modifications.

14. The method of claim 13, further comprising deleting the container files from the disk cache upon expiration of container files' access time stamps.

15. The method of claim 14, wherein the user space daemon shares the container file in the disk cache, if the container files' inodes match the inodes of the commonly used container files from the database.

16. The method of claim 13, further comprising acquiring the cache links from the container files in the private directory and accessing the corresponding container files in the disk cache.

17. The method of claim 13, further comprising copying the container files into the disk cache on-demand by a user space daemon.

18. The system of claim 17, wherein the user space daemon shares the container file in the disk cache, if the container files' inodes match the inodes of the commonly used container files from the database.

19. The method of claim 13, further comprising copying the container files with pre-calculated checksums from a file template cache.

20. A computer implemented method for caching container files, the method comprising:

for a container running on a computer, saving container files into a private directory;

generating checksum attributes for container files accessed by container processes;

assigning the checksum attributes and size attributes to files' inodes;

checking for identical file inodes in a common database;

copying the container files into a disk cache in a lazy mode, if the identical inodes are found, after frequently accessed container files that do not have cache links are detected, wherein the lazy mode includes collecting statistics on container files' accesses and caching the files later based on the statistics; and adding a cache link to the container files in the private directory, wherein the cache link points to a copy of a corresponding container file in the disk cache.

* * * * *